US009064499B2

(12) United States Patent
Tsujikawa et al.

(10) Patent No.: US 9,064,499 B2
(45) Date of Patent: *Jun. 23, 2015

(54) METHOD FOR PROCESSING MULTICHANNEL ACOUSTIC SIGNAL, SYSTEM THEREFOR, AND PROGRAM

(75) Inventors: Masanori Tsujikawa, Tokyo (JP); Tadashi Emori, Tokyo (JP); Yoshifumi Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 244 days.

This patent is subject to a terminal disclaimer.

(21) Appl. No.: 13/201,375

(22) PCT Filed: Feb. 8, 2010

(86) PCT No.: PCT/JP2010/051752

§ 371 (c)(1),
(2), (4) Date: Oct. 7, 2011

(87) PCT Pub. No.: WO2010/092915

PCT Pub. Date: Aug. 19, 2010

(65) Prior Publication Data

US 2012/0029916 A1 Feb. 2, 2012

(30) Foreign Application Priority Data

Feb. 13, 2009 (JP) ................................ 2009-031111

(51) Int. Cl.
*G10L 21/02* (2013.01)
*G10L 15/20* (2006.01)
(Continued)

(52) U.S. Cl.
CPC ........... *G10L 21/0272* (2013.01); *G10L 19/008* (2013.01)

(58) Field of Classification Search
CPC .......................... G10L 21/0272; G10L 19/008
USPC ........ 704/216, 217, 218, 231, 17; 381/17, 92, 381/122, 26, 10, 80, 85, 94.7
See application file for complete search history.

(56) References Cited

U.S. PATENT DOCUMENTS 7,403,609 B2 * 7/2008 Hirai et al. ............... 379/406.01
7,496,482 B2 2/2009 Araki et al.
(Continued)

FOREIGN PATENT DOCUMENTS

JP 2005-308771 A 11/2005
JP 2006-510069 A 3/2006
(Continued)

OTHER PUBLICATIONS

Wrigley, Brown, Wan and Renals, Speech and Crosstalk Detection in Multichannel Audio, IEEE Transactions on Speech and Audio Processing, p. 84-91, vol. 13, No. 1, Jan. 2005.*
(Continued)

*Primary Examiner* — Brian Albertalli
(74) *Attorney, Agent, or Firm* — McGinn IP Law Group, PLLC

(57) ABSTRACT

A method for processing multichannel acoustic signals which is characterized by calculating the feature quantity of each channel from the input signals of a plurality of channels, calculating similarity between the channels in the feature quantity of each channel, selecting channels having high similarity, and separating signals using the input signals of the selected channels.

20 Claims, 3 Drawing Sheets

(51) Int. Cl.
*G10L 21/0272* (2013.01)
*G10L 19/008* (2013.01)

(56) References Cited

U.S. PATENT DOCUMENTS

| | | | | |
|---|---|---|---|---|
| 7,664,643 | B2 * | 2/2010 | Gopinath et al. | 704/256 |
| 2003/0061185 | A1 * | 3/2003 | Lee et al. | 706/20 |
| 2003/0120485 | A1 * | 6/2003 | Murase et al. | 704/228 |
| 2005/0060142 | A1 | 3/2005 | Visser et al. | |
| 2006/0053002 | A1 | 3/2006 | Visser et al. | |
| 2006/0058983 | A1 | 3/2006 | Araki et al. | |
| 2007/0021958 | A1 * | 1/2007 | Visser et al. | 704/226 |
| 2007/0038442 | A1 | 2/2007 | Visser et al. | |
| 2007/0135952 | A1 * | 6/2007 | Chubarev | 700/94 |
| 2008/0052074 | A1 * | 2/2008 | Gopinath et al. | 704/256 |
| 2008/0201138 | A1 | 8/2008 | Visser et al. | |
| 2008/0215651 | A1 * | 9/2008 | Sawada et al. | 708/205 |
| 2008/0228470 | A1 * | 9/2008 | Hiroe | 704/200 |
| 2008/0262834 | A1 * | 10/2008 | Obata et al. | 704/200 |
| 2009/0048824 | A1 * | 2/2009 | Amada | 704/10 |
| 2009/0164212 | A1 * | 6/2009 | Chan et al. | 704/226 |
| 2010/0092007 | A1 * | 4/2010 | Sun | 381/92 |
| 2010/0142327 | A1 * | 6/2010 | K pesi et al. | 367/124 |
| 2010/0232621 | A1 * | 9/2010 | Aichner et al. | 381/94.1 |
| 2012/0197637 | A1 * | 8/2012 | Gratke et al. | 704/226 |

FOREIGN PATENT DOCUMENTS

| | | | |
|---|---|---|---|
| JP | 2008-92363 | A | 4/2008 |
| WO | WO 2005/024788 | A1 | 3/2005 |

OTHER PUBLICATIONS

Pfau, Ellis, and Stolcke, Multispeaker Speech Activity Detection for the ICSI Meeting Recorder, Proceedings IEEE Automatic Speech Recognition and Understanding Workshop, Madonna di Campiglio, 2001.*

Jin, Laskowski, Schultz, and Waibel, Speaker Segmentation and Clustering in Meetings, Proceedings of the 8th International Conference on Spoken Language Processing, Jeju Island, Korea, 2004.*

Huang and Yang, A New Approach of LPC Analysis Based on the Normalization of Vocal-Tract Length, 9th International Conference on Pattern Recognition, pp. 634-636, Nov. 1988.*

Wolfel, Channel Selection by Class Separability Measures for Automatic Transcriptions on Distant Microphones, Interspeech Aug. 27-31, 2007, Antwerp, Belgium.*

Obuchi, Yasunari. "Multiple-microphone robust speech recognition using decoder-based channel selection." ISCA Tutorial and Research Workshop (ITRW) on Statistical and Perceptual Audio Processing. 2004.*

Wölfel, Matthias, et al. "Multi-source far-distance microphone selection and combination for automatic transcription of lectures." INTERSPEECH. 2006.*

Anguera, Xavier, Chuck Wooters, and Javier Hernando. "Acoustic beamforming for speaker diarization of meetings." Audio, Speech, and Language Processing, IEEE Transactions on 15.7 (2007): 2011-2022.*

Aarabi, Parham, and Sam Mavandadi. "Robust speech separation using two-stage independent component analysis." Information Fusion, 2003. Proceedings of the Sixth International Conference of. vol. 2. IEEE, 2003.*

Asano, Futoshi, et al. "Combined approach of array processing and independent component analysis for blind separation of acoustic signals." Speech and Audio Processing, IEEE Transactions on 11.3 (2003): 204-215.*

Winter, Stefan, Hiroshi Sawada, and Shoji Makino. "Geometrical understanding of the PCA subspace method for overdetermined blind source separation." Acoustics, Speech, and Signal Processing, 2003. Proceedings.(ICASSP'03). 2003 IEEE International Conference on. vol. 2. IEEE, 2003.*

* cited by examiner

METHOD FOR PROCESSING MULTICHANNEL ACOUSTIC SIGNAL, SYSTEM THEREFOR, AND PROGRAM

TECHNICAL FIELD

The present invention relates to a multichannel acoustic signal processing method, a multichannel acoustic signal processing system, and a program therefor.

BACKGROUND ART

One example of the related multichannel acoustic signal processing system is described in Patent literature 1. This system is a system for extracting objective voices by removing out-of-object voices and background noise from mixed acoustic signals of voices and noise of a plurality of talkers observed by a plurality of microphones arbitrarily arranged. Further, the above system is a system capable of detecting the objective voices from the above-mentioned mixed acoustic signals.

FIG. 3 is a block diagram illustrating a configuration of the noise removal system disclosed in the Patent literature 1. A configuration and an operation of a point of detecting the objective voices from the mixed acoustic signals in the above noise removal system will be explained schematically. The system includes a signal separator 101 that receives and separates input time series signals of a plurality of channels, a noise estimator 102 that receives the separated signals to be outputted from the signal separator 101, and estimates the noise based upon an intensity ratio coming from an intensity ratio calculator 106, and a noise section detector 103 that receives the separated signals to be outputted from the signal separator 101, noise components estimated by the noise estimator 102, and an output of the intensity ratio calculator 106, and detects a noise section/a voice section.

CITATION LIST

Patent Literature

PTL 1: JP-P2005-308771A (FIG. 1)

SUMMARY OF INVENTION

Technical Problem

While the point of detecting the objective voices from the mixed acoustic signals, which is included in the noise removal system described in the Patent literature 1 explained above, aims for detecting the objective voices from the mixed acoustic signals of voices and noise of a plurality of the talkers observed by a plurality of the microphones arbitrarily arranged, it includes the following problem.

The above problem is that an operation of the signal separator 101 is non-efficient.

The reason thereof is that the signal separation is required in some cases and is not required in some cases, dependent upon microphone signals when it is supposed that a plurality of the microphones are arbitrarily arranged, and for example, the objective voices are detected by employing the signals coming from a plurality of the microphones (microphone signals, namely, input time series signals in FIG. 3). That is, a degree in which the signal separation is necessitated differs dependent upon the processing of a rear stage of the signal separator 101. When a large number of the microphone signals of which the signal separation is not required exist, the signal separator 101 results in expending an enormous calculation amount for the unnecessary processing, and it is non-efficient.

Thereupon, the present invention has been accomplished in consideration of the above-mentioned problems, and an object thereof lies in providing a multichannel acoustic signal processing method capable of efficiently performing signal separation for the input signals of the multichannel, a system therefor and a program therefor.

Solution to Problem

The present invention for solving the above-mentioned problems is a multichannel acoustic signal processing method, comprising: calculating a feature for each channel from input signals of a multichannel; calculating an inter-channel similarity of said by-channel feature; selecting a plurality of the channels of which said similarity is high; and separating the signals by employing the input signals of a plurality of the selected channels.

The present invention for solving the above-mentioned problems is a multichannel acoustic signal processing system, comprising: a feature calculator that calculates a feature for each channel from input signals of a multichannel; a similarity calculator that calculates an inter-channel similarity of said by-channel feature; a channel selector that selects a plurality of the channels of which said similarity is high; and a signal separator that separates the signals by employing the input signals of a plurality of the selected channels.

The present invention for solving the above-mentioned problems is a program causing an information processing device to execute: a feature calculating process of calculating a feature for each channel from input signals of a multichannel; a similarity calculating process of calculating an inter-channel similarity of said by-channel feature; a channel selecting process of selecting a plurality of the channels of which said similarity is high; and a signal separating process of separating the signals by employing the input signals of a plurality of the selected channels.

Advantageous Effect of Invention

The present invention can accomplish an object of the present invention that the channels requiring no signal separation can be removed, and yet the signals are efficiently separated.

DESCRIPTION OF EMBODIMENTS

Hereinafter, the exemplary embodiment of the present invention will be explained in details by making a reference to the accompanied drawings.

Figure 1:
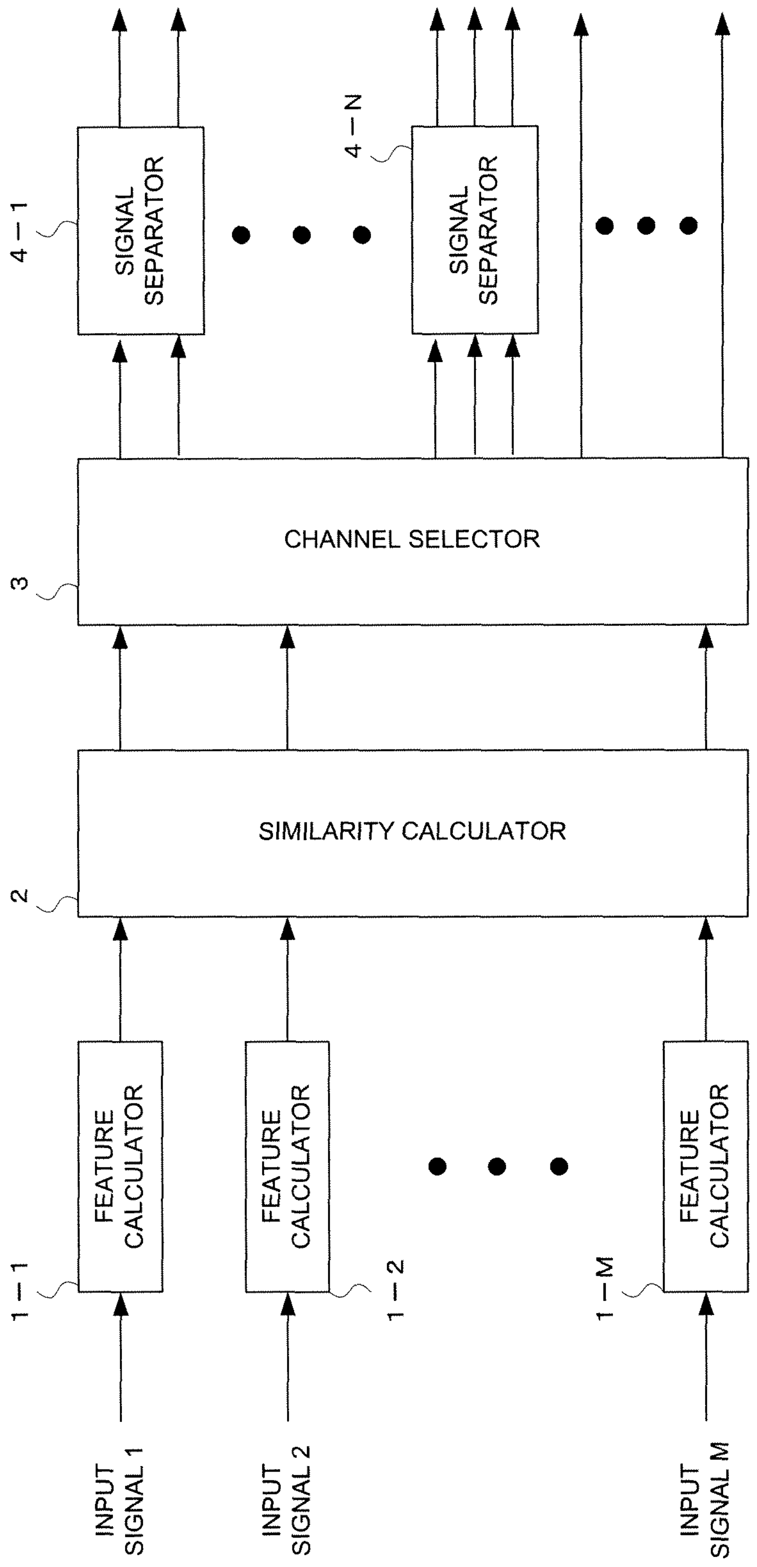
FIG. 1 is block diagram illustrating a configuration of the best mode for carrying out the present invention.

FIG. 1 is a block diagram illustrating a configuration example of the multichannel acoustic signal processing system of the present invention.

The multichannel acoustic signal processing system exemplified in FIG. 1 includes feature calculators 1-1 to 1-M that receive input signals 1 to M and calculate a by-channel feature, respectively, a similarity calculator 2 that receives the features and calculates an inter-channel similarity, a channel selector 3 that receives the inter-channel similarity and selects the channels of which the similarity is high, and signal separators 4-1 to 4-N that receive the input signals of the selected channels of which the similarity is high and separate the signals.

Figure 2:
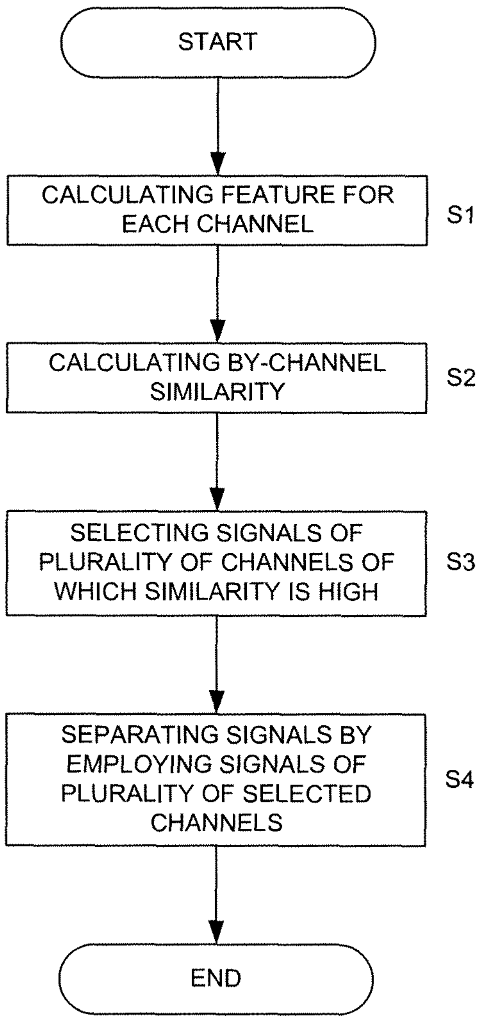
FIG. 2 is a flowchart illustrating an operation of the best mode for carrying out the present invention.
Figure 3:
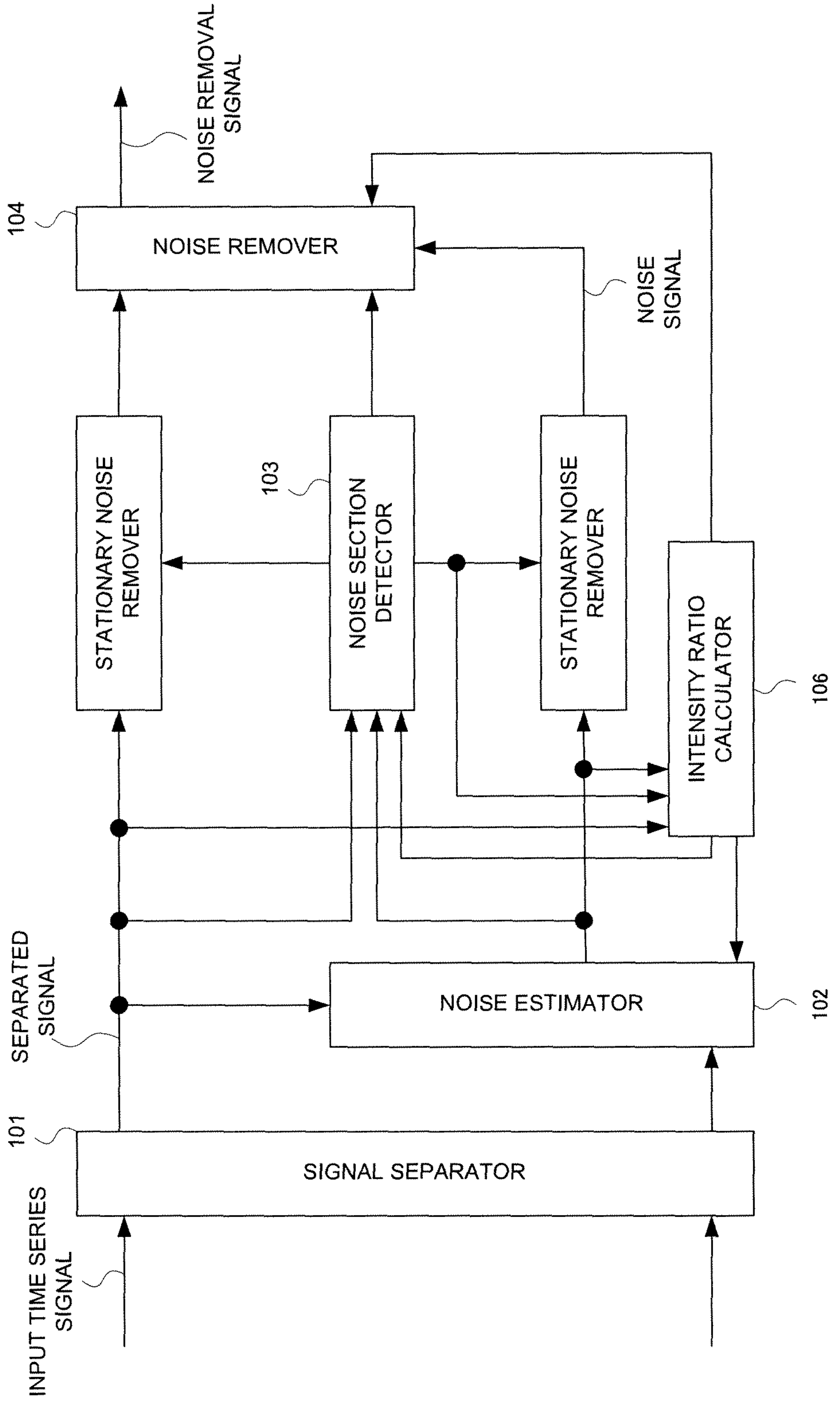
FIG. 3 is a block diagram illustrating a configuration of the noise removal system of the Patent literature 1.

FIG. 2 is a flowchart illustrating a processing procedure in the multichannel acoustic signal processing system related to the exemplary embodiment of the present invention.

The details of the multichannel acoustic signal processing system of this exemplary embodiment of the present invention will be explained below by making a reference to FIG. 1 and FIG. 2.

It is assumed that input signals 1 to M are x1($t$) to xM(t), respectively. Where, t is a sample number. The feature calculators 1-1 to 1-M calculate the features 1 to M from the input signals 1 to M, respectively (step S1).

$$F1(T) = [\,f11(T) \quad f12(T) \quad \ldots \quad f1L(T)\,] \ldots (1\text{-}1)$$

$$F2(T) = [\,f21(T) \quad f22(T) \quad \ldots \quad f2L(T)\,] \ldots (1\text{-}2)$$

$$\vdots$$

$$FM(T) = [\,fM1(T) \quad fM2(T) \quad \ldots \quad fML(T)\,] \ldots (1\text{-}M)$$

Where, F1(T) to FM(T) are the features 1 to M calculated from the input signals 1 to M, respectively. T is an index of time, and it is assumed that a plurality of samples t are one section, and T may be used as an index in its time section.

As shown in numerical equations (I-1) to (I-M), each of the features F1(T) to FM(T) is configured as a vector having an element of an L-dimensional feature (L is a value equal to or more than 1). As the element of the feature, for example, a time waveform (input signal), a statistics quantity such as an averaged power, a frequency spectrum, a logarithmic spectrum of frequency, a cepstrum, a melcepstrum, a likelihood for a acoustic model, a confidence measure (including entropy) for the acoustic model, a phoneme/syllable recognition result, a voice section length, and the like are thinkable.

It can be assumed that not only the features to be directly obtained from the input signals 1 to M, as described above, but also the by-channel value for a certain criteria, being the acoustic model, are the feature, respectively. Additionally, the above-mentioned features are only one example, and needless to say, the other features are also acceptable.

Next, the similarity calculator 2 receives the features 1 to M, and calculates the inter-channel similarity (step S2).

The method of calculating the similarity differs dependent upon the element of the feature.

A correlation value, as a rule, is suitable as an index expressive of the similarity. Further, a distance (difference) value becomes an index expressive of the fact that smaller the value, the higher the similarity. Further, with the case that the feature is the phoneme/syllable recognition result, the method of calculating the similarity is a method of comparing character strings, and a DP matching etc. is utilized for calculating the above similarity in some cases.

Additionally, the above-mentioned correlation value and distance value and the like are only one example, and needless to say, the similarity may be calculated with the indexes other than them. Further, the similarities of all combinations of all channels do not need to be calculated, and with a certain channel, out of M channels, taken as a reference, only the similarity for the above channel may be calculated. Further, with a plurality of times T taken as one section, the similarity in the above time section may be calculated. With the case that the voice section length is included in the feature, it is also possible to omit the processing subsequent it for the channel in which no voice section is detected.

The channel selector 3 receives the inter-channel similarity coming from the similarity calculator 2, and selects and groups the channels of which the similarity is high (step S3).

As a selection method, the method of clustering, for example, the method of grouping the channels of which the similarity is higher than a threshold as a result of comparing the similarity with the threshold, and the method of grouping the channels of which the similarity is relatively high are employed. At that moment, the channel that is selected for a plurality of the groups may exist. Further, the channel that is not selected for any group may exist.

Additionally, the similarity calculator 2 and the channel selector 3 may perform the processing in such a manner that the channels to be selected are narrowed by repeating the processing for the different features such as the calculation of the similarity and the selection of the channel.

The signal separators 4-1 to 4-N perform the signal separation for each group selected by the channel selector 3 (step S4).

The technique founded upon an independent component analysis, the technique founded upon a mean square error minimization, and the like are employed for the signal separation. While it is expected that the output of each signal separator is low in the similarity, there is a possibility that the outputs of the different signal separators include the output having a high similarity. In that case, some of the outputs resembling each other may be discarded, namely, for example, when three outputs resembling each other exist, two of three outputs may be discarded.

This exemplary embodiment performs the signal separation in a small-scale unit based upon the inter-channel similarity without performing the signal separation for all channels, and further, does not input the channel requiring no signal separation into the signal separators. For this reason, it becomes possible to efficiently perform the signal separation as compared with the case of performing the signal separation for all channels.

As mentioned above, this exemplary embodiment calculates the inter-channel similarity of the feature calculated for each channel, and separates the signals for the channels of which the similarity is high. Adopting such a configuration and separating the signals makes it possible to remove the channels requiring no signal separation, whereby an object of the present invention that the signals are efficiently separated can be accomplished.

Additionally, while in the above-described exemplary embodiment, the feature calculators 1-1 to 1-M, the similarity calculator 2, the channel selector 3, and the signal separators 4-1 to 4-N were configured with hardware, one part or an entirety thereof can be also configured with an information processing device that operates under a program.

Further, the content of the above-mentioned exemplary embodiment can be expressed as follows.

(Supplementary note 1) A multichannel acoustic signal processing method, comprising:

calculating a feature for each channel from input signals of a multichannel;

calculating an inter-channel similarity of said by-channel feature;

selecting a plurality of the channels of which said similarity is high; and separating the signals by employing the input signals of a plurality of the selected channels.

(Supplementary note 2) A multichannel acoustic signal processing method according to supplementary note 1, wherein said feature to be calculated for each channel includes at least one of a time waveform, a statistics quantity, a frequency spectrum, a logarithmic spectrum of frequency, a cepstrum, a melcepstrum, a likelihood for an acoustic model, a confidence measure for an acoustic model, a phoneme recognition result, a syllable recognition result, and a voice section length.

(Supplementary note 3) A multichannel acoustic signal processing method according to supplementary note 1 or supplementary note 2, wherein an index expressive of said similarity includes at least one of a correlation value and a distance value.

(Supplementary note 4) A multichannel acoustic signal processing method according to one of supplementary note 1 to supplementary note 3, comprising repeating calculation of said by-channel similarity and selection of a plurality of the channels of which the similarity is high a plurality of number of times by employing the different features, and narrowing the channels that are selected.

(Supplementary note 5) A multichannel acoustic signal processing system, comprising:

a feature calculator that calculates a feature for each channel from input signals of a multichannel;

a similarity calculator that calculates an inter-channel similarity of said by-channel feature;

a channel selector that selects a plurality of the channels of which said similarity is high; and a signal separator that separates the signals by employing the input signals of a plurality of the selected channels.

(Supplementary note 6) A multichannel acoustic signal processing system according to supplementary note 5, wherein said feature calculator calculates at least one of a time waveform, a statistics quantity, a frequency spectrum, a logarithmic spectrum of frequency, a cepstrum, a melcepstrum, a likelihood for an acoustic model, a reliability degree confidence measure for an acoustic model, a phoneme recognition result, a syllable recognition result, and a voice section length as the feature.

(Supplementary note 7) A multichannel acoustic signal processing system according to supplementary note 5 or supplementary note 6, wherein said similarity calculator calculates at least one of a correlation value and a distance value as an index expressive of said similarity.

(Supplementary note 8) A multichannel acoustic signal processing system according to one of supplementary note 5 to supplementary note 7:

wherein said feature calculator calculates the by-channel different features by use of different kinds of the features; and wherein said similarity calculator selects the channels a plurality number of times by employing the different features, and narrows the channels that are selected.

(Supplementary note 9) A program causing an information processing device to execute:

a feature calculating process of calculating a feature for each channel from input signals of a multichannel;

a similarity calculating process of calculating an inter-channel similarity of said by-channel feature;

a channel selecting process of selecting a plurality of the channels of which said similarity is high; and a signal separating process of separating the signals by employing the input signals of a plurality of the selected channels.

(Supplementary note 10) A program according to supplementary note 9, wherein said feature calculating process calculates at least one of a time waveform, a statistics quantity, a frequency spectrum, a logarithmic spectrum of frequency, a cepstrum, a melcepstrum, a likelihood for an acoustic model, a confidence measure for an acoustic model, a phoneme recognition result, a syllable recognition result, and a voice section length as the feature.

(Supplementary note 11) A program according to supplementary note 9 or supplementary note 10, wherein said similarity calculating process calculates at least one of a correlation value and a distance value as an index expressive of said similarity.

(Supplementary note 12) A program according to one of supplementary note 9 to supplementary note 11, wherein said channel selecting process repeats said feature calculating process and said similarity calculating process a plurality number of times by employing the different features, and narrows the channels that are selected.

Above, although the present invention has been particularly described with reference to the preferred embodiments, it should be readily apparent to those of ordinary skill in the art that the present invention is not always limited to the above-mentioned embodiment, and changes and modifications in the form and details may be made without departing from the spirit and scope of the invention.

This application is based upon and claims the benefit of priority from Japanese patent application No. 2009-031111, filed on Feb. 13, 2009, the disclosure of which is incorporated herein in its entirety by reference.

INDUSTRIAL APPLICABILITY

The present invention may be applied to applications such as a multichannel acoustic signal processing apparatus for separating the mixed acoustic signals of voices and noise of a plurality of talkers observed by a plurality of microphones arbitrarily arranged, and a program for causing a computer to realize a multichannel acoustic signal processing apparatus.

REFERENCE SIGNS LIST

1-1 feature calculator for calculating the feature from the input signal 1

1-2 feature calculator for calculating the feature from the input signal 2

1-M feature calculator for calculating the feature from the input signal M

2 similarity calculator

3 channel selector

4-1 signal separator for separating the signal of the channel selected as a group 1

4-N signal separator for separating the signal of the channel selected as a group N

The invention claimed is:

1. A multichannel acoustic signal processing method, comprising:

calculating a feature for each channel from input signals of a multichannel;

calculating an inter-channel similarity of said by-channel feature;

grouping a plurality of the channels of which said similarity is high; and separating the signals for each group for input signals of the grouped channels.

2. The multichannel acoustic signal processing method according to claim 1, wherein said feature to be calculated for each channel includes at least one of a time waveform, a statistics quantity, a frequency spectrum, a logarithmic spectrum of frequency, a cepstrum, a melcepstrum, a likelihood for an acoustic model, a confidence measure for an acoustic model, a phoneme recognition result, a syllable recognition result, and a voice section length.

3. The multichannel acoustic signal processing method according to claim 1, wherein an index expressive of said similarity includes at least one of a correlation value and a distance value.

4. The multichannel acoustic signal processing method according to claim 1, comprising repeating calculation of said by-channel similarity and selection of a plurality of the channels of which the similarity is high a plurality of number of times by employing the different features, and narrowing the channels that are selected.

5. A multichannel acoustic signal processing system including a computer, comprising:

a feature calculator included in the computer that calculates a feature for each channel from input signals of a multichannel;

a similarity calculator included in the computer that calculates an inter-channel similarity of said by-channel feature;

a channel selector that groups a plurality of the channels of which said similarity is high; and a signal separator that separates the signals for each group for input signals of the grouped channels.

6. The multichannel acoustic signal processing system according to claim 5, wherein said feature calculator calculates at least one of a time waveform, a statistics quantity, a frequency spectrum, a logarithmic spectrum of frequency, a cepstrum, a melcepstrum, a likelihood for an acoustic model, a confidence measure for an acoustic model, a phoneme recognition result, a syllable recognition result, and a voice section length as the feature.

7. The multichannel acoustic signal processing system according to claim 5, wherein said similarity calculator calculates at least one of a correlation value and a distance value as an index expressive of said similarity.

8. The multichannel acoustic signal processing system according to claim 5:

wherein said similarity calculator repeats a plurality of calculations of the similarity by use of different kinds of the features, and wherein said channel selector repeats a plurality of selections of the channels.

9. A non-transitory computer readable storage medium storing a program, causing an information processing device to execute, comprising:

a feature calculating process of calculating a feature for each channel from input signals of a multichannel;

a similarity calculating process of calculating an inter-channel similarity of said by-channel feature;

a channel grouping process of grouping a plurality of the channels of which said similarity is high; and a signal separating process of separating the signals for each group for input signals of the grouped channels.

10. The non-transitory computer readable storage medium storing a program according to claim 9, wherein said feature calculating process calculates at least one of a time waveform, a statistics quantity, a frequency spectrum, a logarithmic spectrum of frequency, a cepstrum, a melcepstrum, a likelihood for an acoustic model, a confidence measure for an acoustic model, a phoneme recognition result, a syllable recognition result, and a voice section length as the feature.

11. The non-transitory computer readable storage medium storing a program according to claim 9, wherein said similarity calculating process calculates at least one of a correlation value and a distance value as an index expressive of said similarity.

12. The non-transitory computer readable storage medium storing a program according to claim 9, wherein said channel selecting process repeats said feature calculating process and said similarity calculating process a plurality number of times by employing the different features, and narrows the channels that are selected.

13. The multichannel acoustic signal processing method according to claim 1, further comprising repeating calculation of the inter-channel similarity of the by-channel feature and the selection of the plurality of the channels of which the similarity is high a plurality of number of times by employing different features, and narrowing the channels that are selected.

14. The multichannel acoustic signal processing method according to claim 1, wherein the separating further includes performing signal separation based upon the inter-channel similarity without performing the signal separation for all channels, and does not input a channel requiring no signal separation into signal separators.

15. The multichannel acoustic signal processing method according to claim 5, wherein said similarity calculator repeats a plurality of calculations of the similarity by use of different kinds of the features.

16. The multichannel acoustic signal processing method according to claim 15, wherein said channel selector repeats a plurality of selections of the channels.

17. The multichannel acoustic signal processing system according to claim 5, wherein a non-transitory computer readable storage medium stores a program causing the computer to realize the feature calculator, the similarity calculator, the channel selector, and the signal separator.

18. The multichannel acoustic signal processing system according to claim 5, further comprising a non-transitory computer readable storage medium that stores a program for the multichannel acoustic signal processing system to be executed by the computer.

19. The non-transitory computer readable storage medium storing a program according to claim 9, wherein said similarity calculating process repeats a plurality of calculations of the similarity by use of different kinds of the features.

20. The non-transitory computer readable storage medium storing a program according to claim 19, wherein said channel selecting process repeats a plurality of selections of the channels.

* * * * *